(No Model.) 5 Sheets—Sheet 1.

G. A. BRACHHAUSEN & P. RIESSNER.
MACHINE FOR MAKING NOTE PLATES FOR MUSIC BOXES.

No. 500,373. Patented June 27, 1893.

WITNESSES:

INVENTORS
Gustav A. Brachhausen
Paul Riessner
BY Briesen & Knauth
their ATTORNEYS.

(No Model.) 5 Sheets—Sheet 2.

G. A. BRACHHAUSEN & P. RIESSNER.
MACHINE FOR MAKING NOTE PLATES FOR MUSIC BOXES.

No. 500,373. Patented June 27, 1893.

WITNESSES:
L. M. Hachschlager
E. L. Sherman

INVENTORS
Gustav A. Brachhausen
Paul Riessner
BY Briesen & Knauth
their ATTORNEYS.

(No Model.) 5 Sheets—Sheet 3.

G. A. BRACHHAUSEN & P. RIESSNER.
MACHINE FOR MAKING NOTE PLATES FOR MUSIC BOXES.

No. 500,373. Patented June 27, 1893.

WITNESSES:
L. M. Wachschlager
E. L. Sherman

INVENTORS
Gustav A. Brachhausen,
Paul Riessner
BY Briesen & Knauth
their ATTORNEYS.

(No Model.) 5 Sheets—Sheet 4.
G. A. BRACHHAUSEN & P. RIESSNER.
MACHINE FOR MAKING NOTE PLATES FOR MUSIC BOXES.
No. 500,373. Patented June 27, 1893.
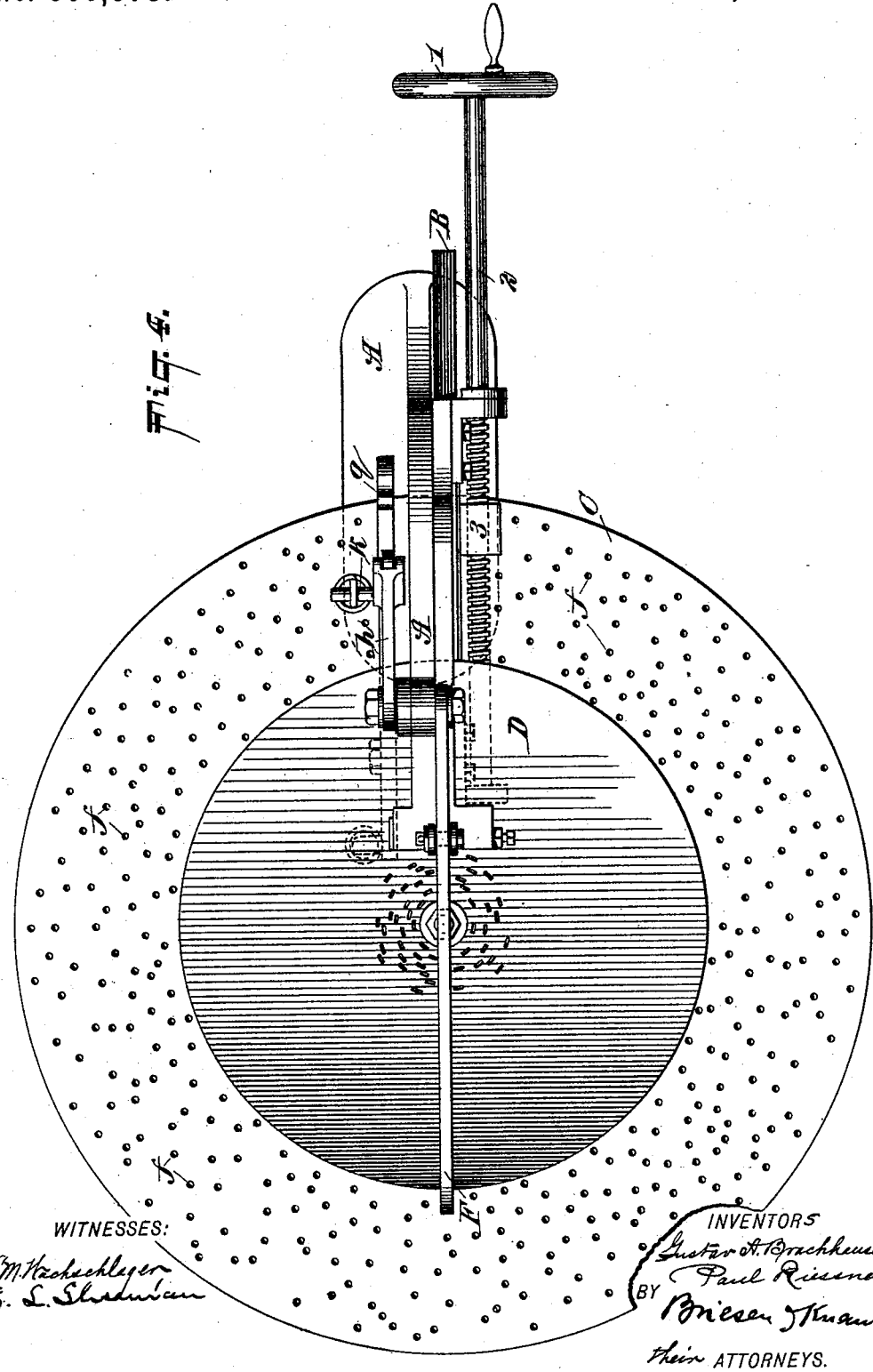

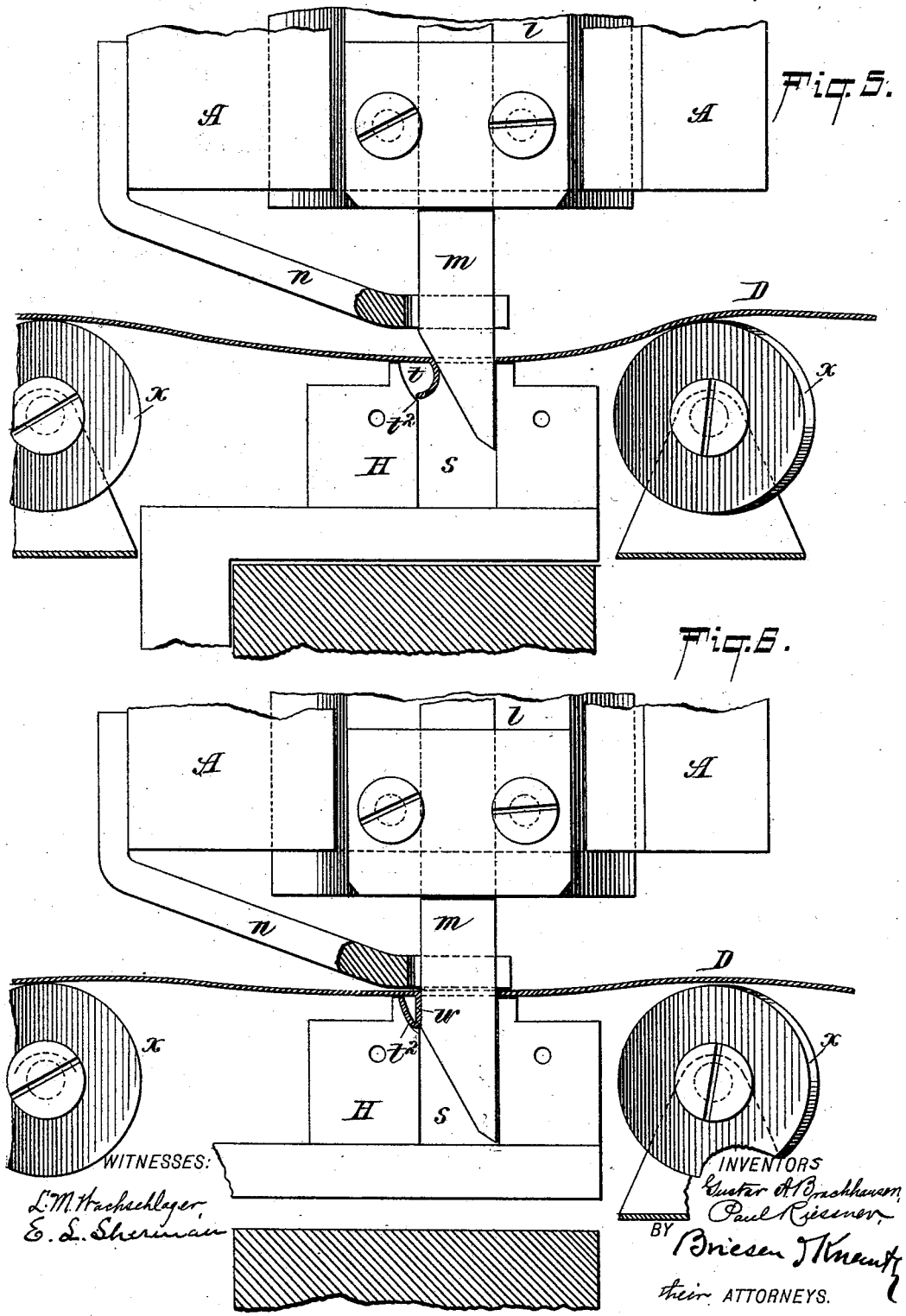

UNITED STATES PATENT OFFICE.

GUSTAV A. BRACHHAUSEN, OF HOBOKEN, NEW JERSEY, AND PAUL RIESSNER, OF EUTRITZSCH, NEAR LEIPSIC, GERMANY.

MACHINE FOR MAKING NOTE-PLATES FOR MUSIC-BOXES.

SPECIFICATION forming part of Letters Patent No. 500,373, dated June 27, 1893.

Application filed January 24, 1893. Serial No. 459,599. (No model.)

*To all whom it may concern:*

Be it known that we, GUSTAV ADOLF BRACHHAUSEN, residing at Hoboken, Hudson county, in the State of New Jersey, and PAUL RIESSNER, residing at Eutritzsch, near Leipsic, German Empire, have invented a new and useful Improvement in Machines for Making Note-Plates for Music-Boxes, &c., of which the following is a full, clear, and exact description, reference being had to the accompanying drawings, forming part thereof, in which—

Figure 1:
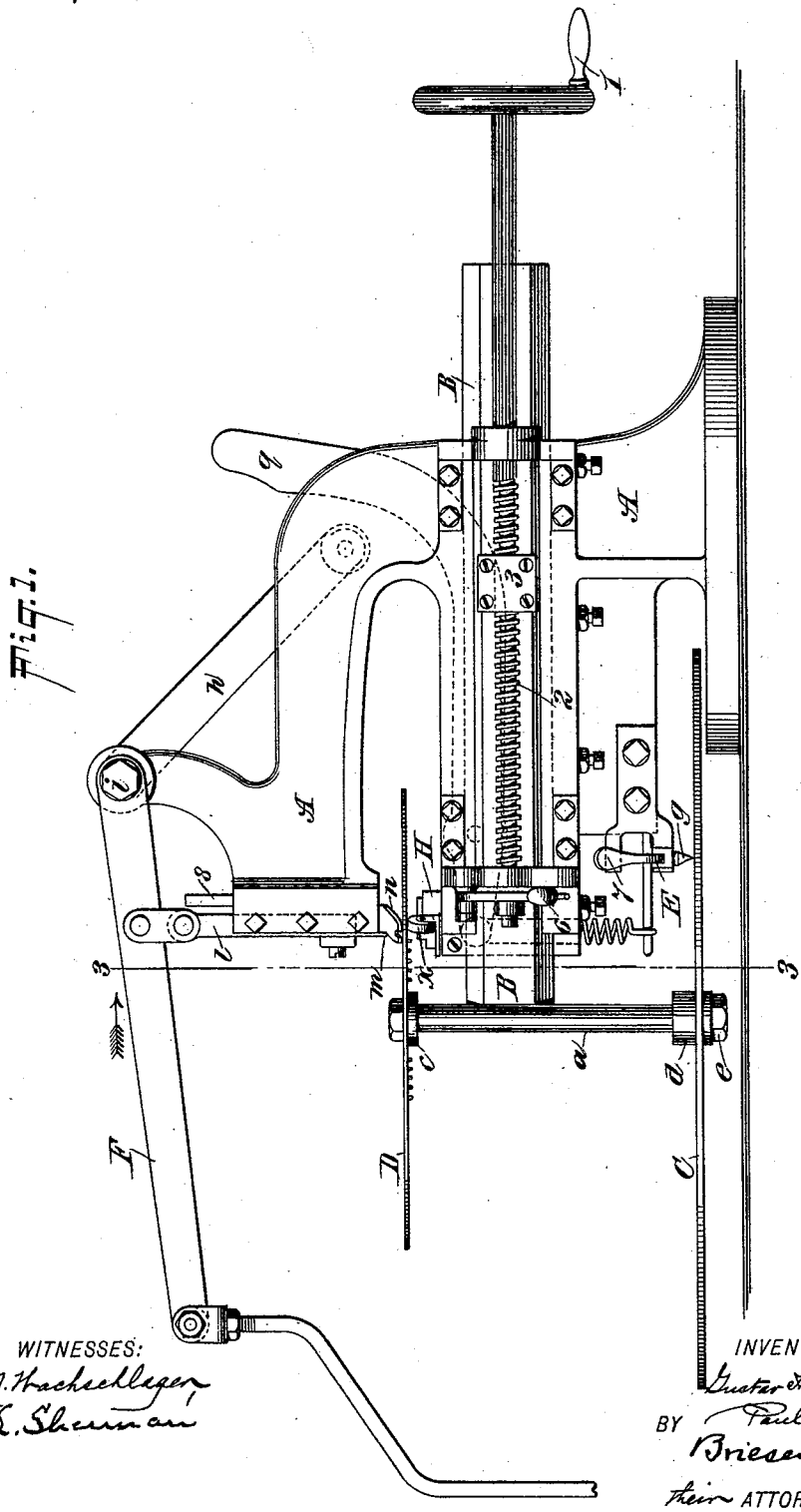
Figure 2:
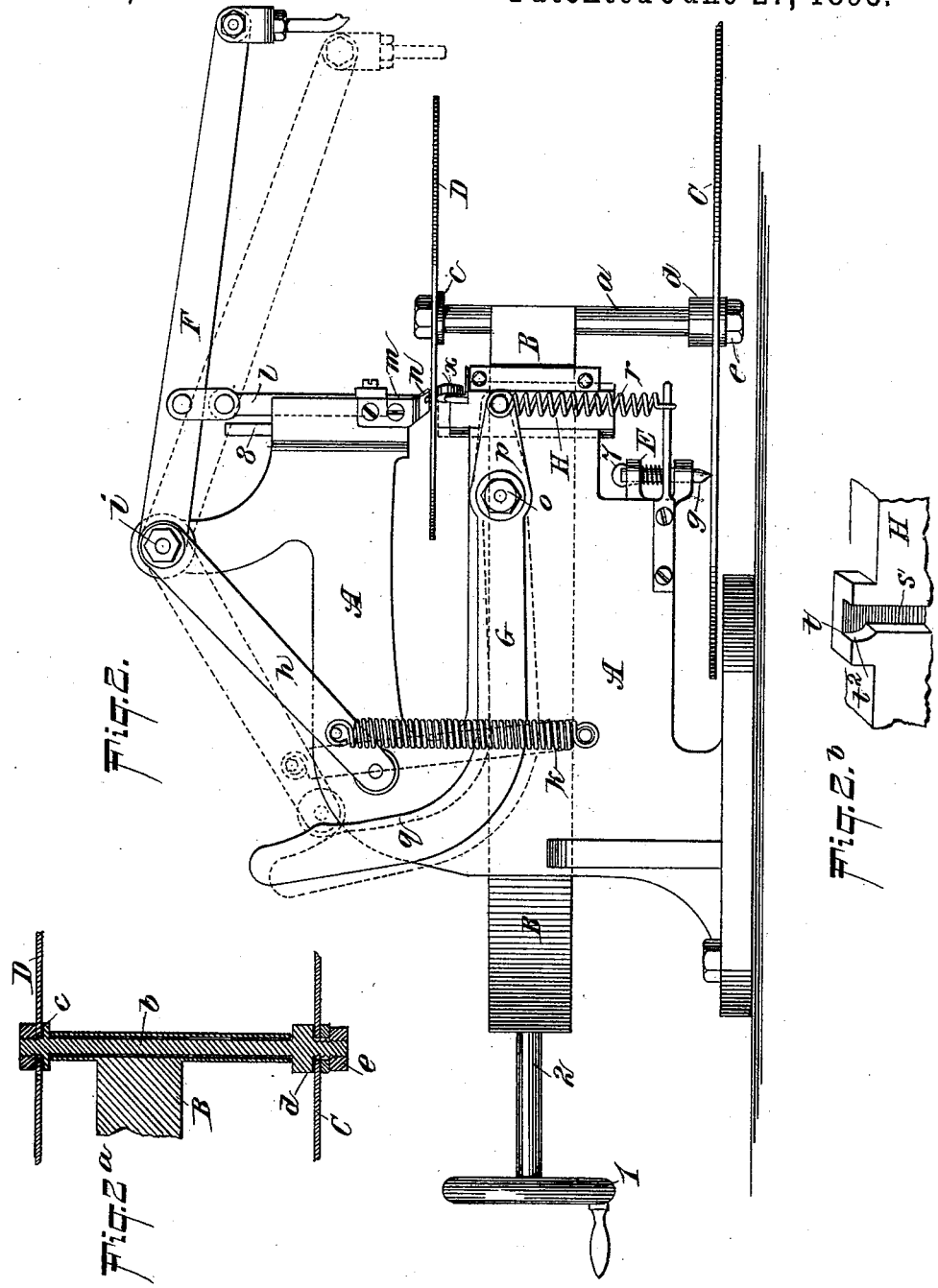
Figure 3:
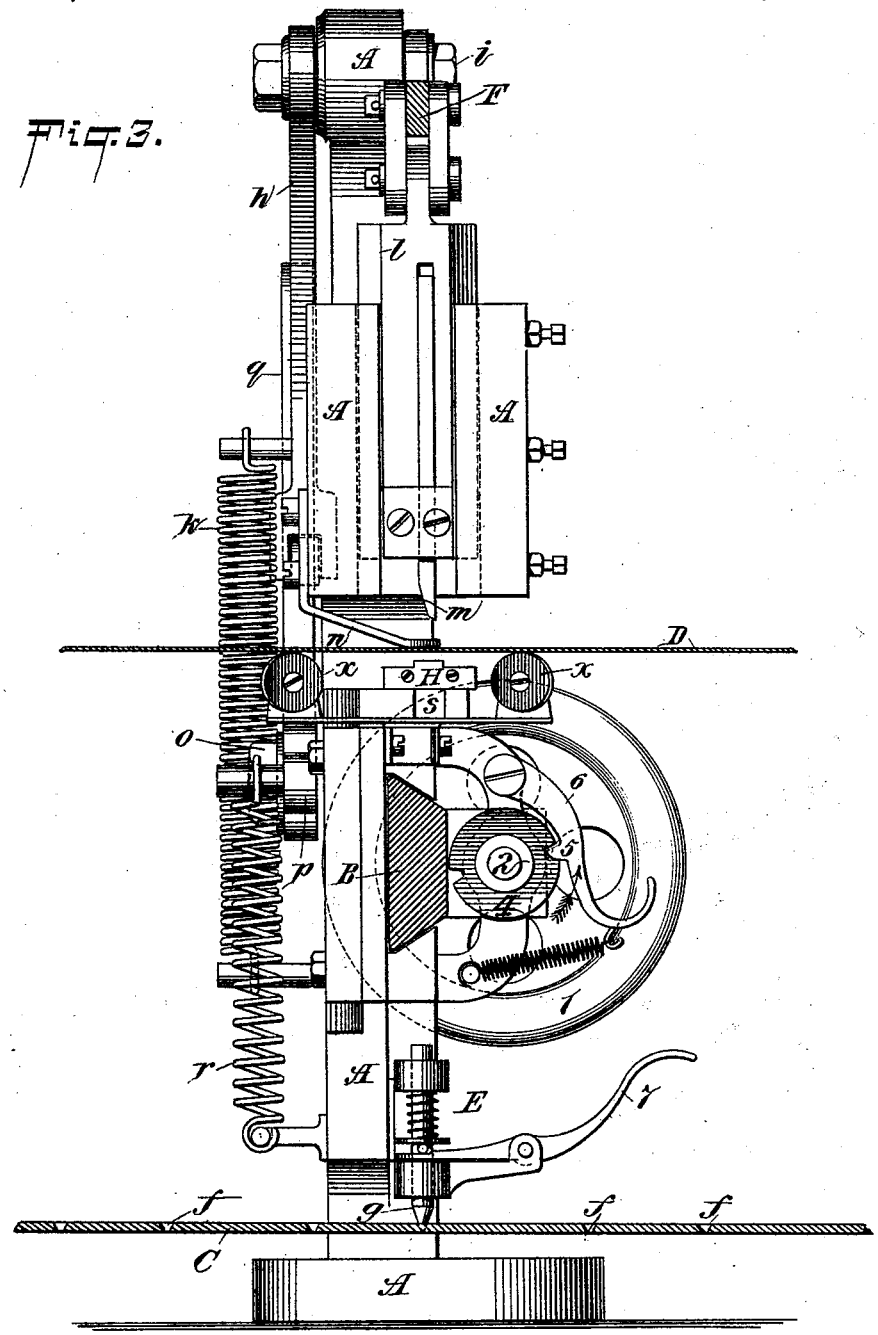

Figure 1 is a front elevation of our improved machine for making note-plates. Fig. 2 is a back view of the same. Figs. 2ª and 2ᵇ are detail views of parts of the machine hereinafter referred to. Fig. 3 is an enlarged vertical section on the line 3—3 of Fig. 1, looking in the direction of the arrow. Fig. 4 is a top view of our improved machine. Fig. 5 is an enlarged detail side view, partly in section, of the cutting and turning mechanism. Fig. 6 is another view of the same, showing the parts in another position.

Our invention relates to a machine especially adapted for cutting and forming teeth upon music-disks, cylinders, and the like, or for other purposes.

Our invention consists in the arrangement and combination of parts hereinafter described and specifically pointed out in the claims.

In the drawings, A represents the main frame of the machine which supports a sliding carriage B, to which a sleeve $a$ projecting at right angles is secured. This sleeve $a$ embraces a shaft $b$ which is preferably provided with flanges $c$ $d$, as in Fig. 2ª, said flanges bearing against the ends of the sleeve.

The carriage B can be reciprocated by a screw-shaft 2, turned by a hand-wheel 1 and meshing into a nut 3 that is secured to the carriage. Upon the screw-shaft 2 is mounted a notched disk 4, against the periphery of which bears a cam-shaped lug 5 projecting from a spring-pressed lever 6. It will be seen that as the hand-wheel 1 is turned, the disk 4 is also rotated until one of the notches therein comes into alignment with the cam-shaped lug 5, which instantly enters the notch, as in Fig. 3. If the screw-shaft be now turned in the direction of the arrow shown near it in Fig. 3 (which is the direction that moves the carriage inward) the lug 5 will, because of its form, not interfere with such rotation, but will be crowded out of the advancing notch. But a rotation in the opposite direction is positively prevented by the said lug in said notch, so that it will be necessary, if the carriage is to be drawn outward to draw the lever 6 by hand out of contact with the disk 4, whereupon the screw-shaft 2 can be turned in the direction opposite that indicated by the arrow. The operator when turning the shaft 2 in the direction of the said arrow, draws the sleeve $a$ inward; but when he moves the carriage outward, and with it the sleeve $a$, he finds progress arrested at regular intervals by the tooth 5 entering the notch in disk 4, and locking the latter. He thereby is forced to measure such advance movement. That is, supposing a half revolution of the shaft 2 forced the carriage B outward one-sixteenth of an inch, then a rotation of the disk from one notch to the other, if the disk has two notches on diametrically opposite sides, would represent a horizontal movement of one-sixteenth, of the sleeve $a$ and all the parts carried thereby, in a direction away from the frame A.

To the lower end of the shaft $b$ is removably secured by any suitable means, as shown at $e$, a pattern-disk C provided with numerous indentations $f$ (Fig. 3), which correspond in relative location on the disk C to the location of the teeth or projections to be formed on the music disk or note-plate. At the upper end of the shaft $b$ is removably secured the blank D of the note-plate or music-disk upon which the teeth or projections are to be formed. A rotation of the pattern-disk C causes a corresponding rotation of the blank D, while a rotation of the hand-wheel 1 causes a horizontal movement of the shaft $b$, pattern-disk C and blank D.

E is the gage or pattern arrester (see Fig. 3) which consists of a spring-pressed pointer $g$ which is normally held in contact with the pattern-disk C and is pressed into apertures or depressions $f$ therein as they come directly beneath said pointer, it being afterward released therefrom by pressure on a lever 7. By means of this mechanism E and the pattern-disk C the location of the projecting pins to be formed on the blank D is successively determined.

F is a lever which has an arm $h$ and is pivoted to the frame A at $i$, that is, the lever is preferably of the bell-crank form and is adapted to be held normally in the position shown by full lines in Fig. 2 by a spring $k$ or otherwise. Its downward movement may be limited by a stop 8. This lever F is operated by hand, by treadle or other suitable means, and is connected to a reciprocating punch-carrier $l$ in which the beveled punch $m$ is adjustably held, as shown in Fig. 3.

$n$ is a foot which is secured to upper arm of the frame A and adapted to bear upon the blank disk D at or near the point where the punch $m$ penetrates it for purposes which will be hereinafter described.

G is a lever which is pivoted to the lower part of the frame A, as shown at $o$, and has one arm $p$ which connects with spring $r$, and another arm $q$ which under the influence of the spring $r$ projects in the path of the arm $h$ of the lever F. The portion $p$ of the lever G is pivoted to the vertically reciprocating bed-plate H; the spring $r$ acting to normally hold the bed-plate H and the portion $p$ of the lever G down in the lowest position, consequently causing the curved arm $q$ of said lever to be forced up into the path of the arm $h$ of lever F. It will be seen from this arrangement that as the lever F forces down the punch $m$, causing it to penetrate the disk or blank D, the arm $h$ of said lever will contact with the curved arm $q$, causing the bed plate H to be moved up (as shown in dotted lines in Fig. 2), so that by the time the cut is completed in the blank D, the bed-plate H will have reached the limit of its upward movement, when it crowds the disk D against the foot $n$, as in Fig. 6 and the purposes of which will be hereinafter described. For properly supporting the disk D during the act of punching, we provide supporting rollers $x$ $x$, as shown. The bed-plate H is provided with a slot $s$ of a size sufficiently large to admit the punch $m$. This slot $s$ at the upper part has a concave enlargement $t$, whose concave wall $t^2$ (see Fig. $2^b$) serves as the tooth forming die, doubling the tooth while it is being cut by the punch. It will be seen that, in view of the fact that the punch $m$ and the pointer $g$ are capable of being placed at different distances from the axis of rotation of the pattern-disk C and of the music-blank D, we are enabled to produce on a smaller disk and in closer circles the notes that are represented by the depressions $f$ on the larger pattern-disk C. It follows that any slight irregularity in the pattern-disk will be rendered so small on the music-plate D by the translation from large to small that it will not detrimentally affect said plate.

Having described the details of our invention, we will now proceed to describe the operation thereof: A pattern-disk C having indentations $f$ corresponding to the teeth to be produced upon the music-disk, is first secured to the lower end of the shaft $b$ and a blank disk D is fastened upon the upper end of the shaft. The hand-wheel 1 is then turned backward (that is in direction of arrow in Fig. 3) until the central portion of the disk D is below the punch $m$, or in other words, until the pointer $g$ is in alignment with the innermost depression $f$ or circle of such depressions in the pattern-disk C. The pattern-disk C is turned by hand or otherwise until a depression $f$ is encountered by the pointer $g$ which will cause the rotation of the disk C and the blank D to be stopped. The lever F is then moved so as to depress the punch $m$, causing it to penetrate the blank, and at the same time causing the bed-plate H to be moved upward. It will be seen that when the punch $m$ penetrates the blank D, it punches out a tooth of a length equal to the width of said punch, one end of said tooth remaining attached to the blank D. The tooth is curled because of the beveled portion of the punch $m$, during the process of cutting, crowding the thin piece of flexible metal away from it; that is to say, as the punch gradually penetrates the blank, the beveled portion of said punch imparts a gradually increasing curl or bend to the tooth, forcing it toward the wall $t^2$ of the die $t$, as shown in Fig. 5. When the partly curled tooth reaches the concave or inclined wall $t^2$ of the die, the bed-plate begins to arise, while the punch $m$ still continues its downward movement, one (the beveled punch) causing a further curling of the tooth, while the other (the die in the bed-plate) causes it to double and also to flatten, as in Fig. 6, against the vertical edge of the punch, which at the finish is in line with the die $t^2$. By this means a tooth $w$ (Fig. 6) is produced from the piece of metal partly punched from the plate D, the free end of said tooth being directly under the plate D. The straight face of said tooth which was in contact with the straight edge of the punch, is its actuating edge in the music-box; the other bent part being a brace that keeps the actuating portion in position and prevents it from being bent aside. The plate D on which these teeth $w$ are formed in manner described should be of flexible metal, alloy or the like. After the tooth is cut and formed, the parts of the machine that are controlled by the springs $k$ and $r$ are allowed to resume their normal positions, as shown in Figs. 1, 2 and 3. The lever 7 is then depressed, causing the pointer $g$ to be withdrawn from the depression $f$ in which it rested, and the pattern-disk C is rotated (causing the rotation of the blank D) until the pointer $g$ enters another aperture $f$, when another tooth is formed in the blank D as above described, and so on until one complete circuit of the pattern-disk C is had. Supposing that a half rotation of the worm-shaft 2 causes the carriage B to be advanced one-sixteenth of an inch, and supposing that the width of the teeth to be formed on the music-plate is something less than a sixteenth of an inch, and that the innermost row of teeth has been formed on the blank D in manner described, then a half turn given to the shaft 2 in direction opposite to that of the arrow shown in Fig. 3 moves the carriage outward another sixteenth of an inch after the lever 6 is first moved off the disk 4 by hand to enable this motion to be started. After this the necessary teeth are cut and formed in the second circle, &c., until the music-plate is properly finished.

Having described our invention and its operation, what we claim, and desire to secure by Letters Patent, is—

1. The combination of punch $m$, bed-plate H and die $t^2$ formed in said bed-plate, and means substantially as described for automatically moving said bed-plate when the punch is operated, as specified.

2. The combination of the punch $m$, means substantially as described for operating said punch, bed-plate H, having slot $s'$ and die $t^2$, and means substantially as described for moving said bed-plate, all arranged substantially as described.

3. As a new article of manufacture, the bed-plate H having upright slot $s$, lateral enlargement $t$ of said slot and inclined die $t^2$ at the outer side of said enlargement, substantially as described.

4. The combination of the punch $m$ with the movable bed-plate H, having slot $s$, and die $t^2$ formed in said bed-plate, and with the foot $n$, all arranged substantially as described.

5. The combination of the tooth-forming punch and die as described with the pattern-plate C and pointer $g$ for indicating where the tooth is to be formed, as and for the purposes set forth.

6. The combination of the tooth-forming punch and die, horizontally adjustable shaft $b$, pattern disk C and pattern arrester E, all arranged substantially as described.

7. The combination of a tooth-forming punch and die with the horizontally movable carriage B, upright shaft $b$, carried thereby, pattern-plate C mounted on said shaft $b$, and pattern arrester E, all arranged substantially as described.

8. The combination of a tooth-forming punch and die, adjustable carriage B, means substantially as described for determining the extent of adjustment of said carriage, shaft $b$, pattern-plate C carried by said shaft, and pattern arrester E, all arranged substantially as described.

9. The combination of the carriage B and shaft $b$ carried thereby, with the pattern-plate C mounted on said shaft $b$ and having depressions $f$, the spring-pressed pointer $g$ adapted to automatically engage in said depressions $f$, when the same pass under said pointer, and means substantially as described for moving said pattern-plate under the pointer in a transverse direction to the shaft $b$ as and for the purposes described.

10. The carriage B having nut 3 combined with the screw-shaft 2 having notched disk 4 and with the spring-pressed lever 6 having cam-shaped lug 5, substantially as and for the purpose herein shown and described.

11. In a machine for punching a music-plate, the combination of a shaft adapted to carry said music-plate with a pattern-plate C carried by said shaft, means substantially as described for turning, horizontally moving and arresting said shaft, and with a punch and die and means substantially as described for actuating the same, all as specified.

GUSTAV A. BRACHHAUSEN.
PAUL RIESSNER.

Witnesses to Gustav A. Brachhausen:
HARRY M. TURK,
E. L. SHERMAN.
Witnesses to Paul Riessner:
E. VOIGTLAENDER,
CARL BORNGRAEBER.